United States Patent
Sugiyama

(10) Patent No.: US 9,625,197 B2
(45) Date of Patent: Apr. 18, 2017

(54) CONSTANT-TEMPERATURE LIQUID CIRCULATION APPARATUS AND OPERATION METHOD THEREOF

(71) Applicant: SMC CORPORATION, Chiyoda-ku (JP)

(72) Inventor: Shintaro Sugiyama, Sagamihara (JP)

(73) Assignee: SMC CORPORATION, Chiyoda-ku (JP)

( * ) Notice: Subject to any disclaimer, the term of this patent is extended or adjusted under 35 U.S.C. 154(b) by 334 days.

(21) Appl. No.: 14/317,674

(22) Filed: Jun. 27, 2014

(65) Prior Publication Data
US 2015/0007599 A1 Jan. 8, 2015

(30) Foreign Application Priority Data
Jul. 4, 2013 (JP) .................... 2013-141070

(51) Int. Cl.
F25B 49/02 (2006.01)
F25B 1/00 (2006.01)
(Continued)

(52) U.S. Cl.
CPC .............. F25B 49/02 (2013.01); F25B 1/005 (2013.01); F25B 25/005 (2013.01);
(Continued)

(58) Field of Classification Search
CPC ........ F25B 1/005; F25B 25/005; F25B 49/02; F25B 2600/021; F25B 2600/0253; F25B 17/06; F25B 49/027
(Continued)

(56) References Cited

U.S. PATENT DOCUMENTS 6,272,870 B1 * 8/2001 Schaeffer ................ F25B 41/04
62/196.4
6,499,308 B2 * 12/2002 Inoue ...................... F25B 13/00
62/228.3
(Continued)

FOREIGN PATENT DOCUMENTS

CN 1515860 A 7/2004
CN 202371848 U 8/2012
(Continued)

OTHER PUBLICATIONS

Combined Chinese Office Action and Search Report issued on Mar. 3, 2016 in Patent Application No. 201410317172.1 (with English language translation).
(Continued)

Primary Examiner — Timothy L Maust
(74) Attorney, Agent, or Firm — Oblon, McClelland, Maier & Neustadt, L.L.P.

(57) ABSTRACT

An operation method of a constant-temperature liquid circulation apparatus includes: performing control such that the fan is not activated, or is activated to maintain a minimum rotation speed when a refrigerant pressure measured by the pressure sensor does not reach a reference pressure region after the compressor is activated; controlling the refrigerant pressure by performing inverter control on a rotation speed of the fan when the refrigerant pressure reaches the reference pressure region; and controlling a rotation speed of the compressor to be reduced from a high rotation speed which is a rotation speed during a steady operation while maintaining the rotation speed of the fan at a maximum rotation speed when the refrigerant pressure continues to further rise and exceeds an upper limit value even after the rotation speed of the fan reaches the maximum rotation speed.

4 Claims, 3 Drawing Sheets

(51) Int. Cl.
*F25D 17/06* (2006.01)
*F25B 25/00* (2006.01)

(52) U.S. Cl.
CPC ............ *F25B 49/027* (2013.01); *F25D 17/06* (2013.01); *F25B 2600/0253* (2013.01); *F25B 2600/111* (2013.01); *F25B 2700/191* (2013.01); *Y02B 30/741* (2013.01); *Y02B 30/743* (2013.01)

(58) Field of Classification Search
USPC .................................... 62/183, 228.1, 228.3
See application file for complete search history.

(56) References Cited

U.S. PATENT DOCUMENTS

| | | | | |
|---|---|---|---|---|
| 6,637,226 | B2* | 10/2003 | Watanabe | F25B 41/04 62/196.4 |
| 7,237,395 | B2* | 7/2007 | Rafalovich | F25D 29/00 62/199 |
| 7,841,195 | B2* | 11/2010 | Nakayama | F25B 49/027 62/183 |
| 2004/0187504 | A1* | 9/2004 | Healy | F25B 41/04 62/203 |
| 2005/0072170 | A1* | 4/2005 | Taniguchi | B01D 5/0093 62/183 |
| 2007/0199337 | A1* | 8/2007 | Otake | F24D 17/02 62/183 |
| 2015/0330689 | A1* | 11/2015 | Kato | F25B 13/00 62/115 |

FOREIGN PATENT DOCUMENTS

| | | |
|---|---|---|
| JP | 10-311642 A | 11/1998 |
| JP | 2002-22337 | 1/2002 |
| JP | 2003-2044 A | 1/2003 |
| JP | 2005-16947 A | 1/2005 |
| KR | 10-2007-0106185 A | 11/2007 |

OTHER PUBLICATIONS

Office Action issued May 27, 2014 in Japanese Patent Application No. 2013-141070 (with English language translation).
U.S. Appl. No. 14/340,964, filed Jul. 25, 2014, Sugiyama.
Office Action issued Jul. 9, 2015 in Korean Patent Application No. 10-2014-0082419 (with English language translation).

* cited by examiner

CONSTANT-TEMPERATURE LIQUID CIRCULATION APPARATUS AND OPERATION METHOD THEREOF

TECHNICAL FIELD

The invention relates to a constant-temperature liquid circulation apparatus which supplies a temperature-adjusted constant-temperature liquid to a load to cool or heat the load and an operation method thereof.

BACKGROUND ART

The constant-temperature liquid circulation apparatus which supplies the temperature-adjusted constant-temperature liquid to the load to cool or heat the load has been well known, in which an example thereof is disclosed in Patent literature 1. In general, this kind of constant-temperature liquid circulation apparatus has a configuration schematically illustrated in FIG. 3 and includes a constant-temperature liquid circuit 51 supplying a temperature-adjusted constant-temperature liquid to a load 50 in a circulating manner and a refrigeration circuit 52 adjusting a temperature of the constant-temperature liquid.

The constant-temperature liquid circuit 51 includes a tank 53 accommodating the constant-temperature liquid, a pump 54 supplying the constant-temperature liquid in the tank 53 to the load 50, and a cooling pipe 56 cooling the constant-temperature liquid, in which the temperature is risen by cooling of the load 50, by heat exchange with a refrigerant in a heat exchanger 55 to return the cooled constant-temperature liquid to the tank 53.

In addition, the refrigeration circuit 52 includes a compressor 57 compressing a gaseous refrigerant to change the refrigerant into a high-temperature and high-pressure gaseous refrigerant, an air-cooling condenser 58 cooling the high-temperature and high-pressure gaseous refrigerant sent from the compressor 57 to change the refrigerant into a high-pressure liquid refrigerant, a fan 59 forcing cooling air to flow into the condenser 58, an expansion valve 60 expanding the high-pressure liquid refrigerant sent from the condenser 58 to change the refrigerant into a low-temperature and low-pressure liquid refrigerant, and an evaporator 61 evaporating the low-temperature and low-pressure liquid refrigerant sent from the expansion valve 60 by heat exchange with the constant-temperature liquid in the heat exchanger 55 to change the refrigerant into a low-pressure gaseous refrigerant, thereby sending the low-pressure gaseous refrigerant to the compressor 57.

The inside of the refrigeration circuit 52 is divided into a high-pressure side portion in which the refrigerant pressure is high and a low-pressure side portion in which the refrigerant pressure is low. The high-pressure side portion is a portion extending from the compressor 57 to the expansion valve 60 via the condenser 58, and on the other hand, the low-pressure side portion is a portion extending from the expansion valve 60 to the compressor 57 via the evaporator 61.

Here, a refrigerant pressure at the high-pressure side portion depends on a condensation temperature which is a temperature when a gaseous refrigerant is liquefied inside the condenser 58. For example, the refrigerant pressure becomes higher when the condensation temperature is high, and the refrigerant pressure becomes lower when the condensation temperature is low.

In addition, when the condenser 58 is an air-cooling type, the refrigerant pressure at the high-pressure side portion depends on an ambient temperature (particularly, outside air temperature) of the constant-temperature liquid circulation apparatus, a ventilation rate of cooling air flowing into the condenser 58 by the fan 59, a flow rate of the refrigerant discharged from the compressor 57. That is, the condensation temperature rises and the refrigerant pressure also rises when the ambient temperature rises, and the condensation temperature falls and the refrigerant pressure is also lowered when the ambient temperature falls. In addition, when the rotation speed of the fan 59 increases and the ventilation rate of the cooling air increases, the condensation temperature falls and the refrigerant pressure is also lowered, and when the rotation speed of the fan 59 decreases and the ventilation rate of the cooling air decreases, the condensation temperature rises and the refrigerant pressure also rises. Further, when the flow rate of the refrigerant discharged from the compressor 57 is reduced, the condensation temperature falls and the refrigerant pressure is lowered, and the flow rate of the refrigerant discharged from the compressor 57 increases, the condensation temperature rises and the refrigerant pressure also rises.

When the refrigerant pressure at the high-pressure side portion becomes too high, a dangerous state is caused in an excess of a withstand pressure limit of piping or use parts. For this reason, the constant-temperature liquid circulation apparatus of the related art is configured to increase the rotation speed of the fan 59 and to increase the flow rate of the cooling air when the refrigerant pressure at the high-pressure side portion is increased. However, even when the rotation speed of the fan 59 is increased to the maximum rotation speed, the refrigerant pressure continues to rise due to, for example, the influence of the ambient temperature in some cases. In these cases, the damage of the piping or use parts is prevented by stopping the operation of the compressor 57.

However, in the case of stopping the operation of the compressor 57, since the refrigeration circuit does not function or the operation of the entire constant-temperature liquid circulation apparatus should be stopped, it is difficult to adjust the temperature of the constant-temperature liquid.

CITATION LIST

Patent Literature

PTJ1: Japanese Unexamined Patent Application Publication No. 2002-22337

SUMMARY OF INVENTION

Technical Problem

An object of the invention is to reduce the refrigerant pressure without stopping the compressor even when the refrigerant pressure inside the refrigeration circuit is increased and thus to continuously control the temperature of the constant-temperature liquid without stopping the refrigeration circuit or stopping the entire constant-temperature liquid circulation apparatus.

Solution to Problem

In order to achieve the above object, according to the invention, the constant-temperature liquid circulation apparatus includes: a constant-temperature liquid circuit supplying a temperature-adjusted constant-temperature liquid to a load; a refrigeration circuit adjusting a temperature of the constant-temperature liquid by heat exchange of the constant-temperature liquid with a refrigerant; and a controller controlling the entire apparatus, wherein the refrigeration circuit includes: a compressor compressing a gaseous refrigerant to change the refrigerant into a high-temperature and high-pressure gaseous refrigerant; an air-cooling condenser cooling the high-temperature and high-pressure gaseous refrigerant sent from the compressor to change the refrigerant into a high-pressure liquid refrigerant; a fan forcing cooling air to flow into the condenser; an expansion valve expanding the high-pressure liquid refrigerant sent from the condenser to change the refrigerant into a low-temperature and low-pressure liquid refrigerant; an evaporator evaporating the low-temperature and low-pressure liquid refrigerant sent from the expansion valve by heat exchange with the constant-temperature liquid to change the refrigerant into a low-pressure gaseous refrigerant, thereby sending the low-pressure gaseous refrigerant to the compressor; and a pressure sensor measuring an inlet-side refrigerant pressure of the expansion valve, and wherein the controller is configured to perform control such that the fan is not activated, or is activated to maintain a minimum rotation speed when a refrigerant pressure measured by the pressure sensor does not reach a reference pressure region after the compressor is activated, control the refrigerant pressure by performing inverter control on a rotation speed of the fan when the refrigerant pressure reaches the reference pressure region, and control a rotation speed of the compressor to be reduced from a high rotation speed which is a rotation speed during a steady operation while maintaining the rotation speed of the fan at a maximum rotation speed when the refrigerant pressure continues to further rise and exceeds an upper limit value even after the rotation speed of the fan reaches the maximum rotation speed.

In addition, according to the invention, in a method of operating a constant-temperature liquid circulation apparatus including: a constant-temperature liquid circuit supplying a temperature-adjusted constant-temperature liquid to a load; and a refrigeration circuit adjusting a temperature of the constant-temperature liquid by heat exchange of the constant-temperature liquid with a refrigerant, the refrigeration circuit including: a compressor compressing a gaseous refrigerant to change the refrigerant into a high-temperature and high-pressure gaseous refrigerant; an air-cooling condenser cooling the high-temperature and high-pressure gaseous refrigerant sent from the compressor to change the refrigerant into a high-pressure liquid refrigerant; a fan forcing cooling air to flow into the condenser; an expansion valve expanding the high-pressure liquid refrigerant sent from the condenser to change the refrigerant into a low-temperature and low-pressure liquid refrigerant; an evaporator configured to evaporate the low-temperature and low-pressure liquid refrigerant sent from the expansion valve by heat exchange with the constant-temperature liquid and to make a low-pressure gaseous refrigerant, thereby sending the low-pressure gaseous refrigerant to the compressor; and a pressure sensor measuring an inlet-side refrigerant pressure of the expansion valve, the method includes; performing control such that the fan is not activated, or is activated to maintain a minimum rotation speed when a refrigerant pressure measured by the pressure sensor does not reach a reference pressure region after the compressor is activated; controlling the refrigerant pressure by performing inverter control on a rotation speed of the fan when the refrigerant pressure reaches the reference pressure region; and controlling a rotation speed of the compressor to be reduced from a high rotation speed which is a rotation speed during a steady operation while maintaining the rotation speed of the fan at a maximum rotation speed when the refrigerant pressure continues to further rise and exceeds an upper limit value even after the rotation speed of the fan reaches the maximum rotation speed.

In the invention, the rotation speed of the compressor may be controlled to be reduced from the high rotation speed to a low rotation speed at which a refrigerant pressure becomes constant near the upper limit value when the refrigerant pressure reaches the upper limit value.

According to the invention, it is possible to reduce the refrigerant pressure without stopping the compressor by performing the inverter control on the rotation speed of the compressor and the rotation speed of the fan of the air-cooling condenser according to the refrigerant pressure in the refrigeration circuit. As a result, it is possible to continuously operate the refrigeration circuit and to continuously perform the temperature control of the constant-temperature liquid.

DESCRIPTION OF EMBODIMENTS

Figure 1:
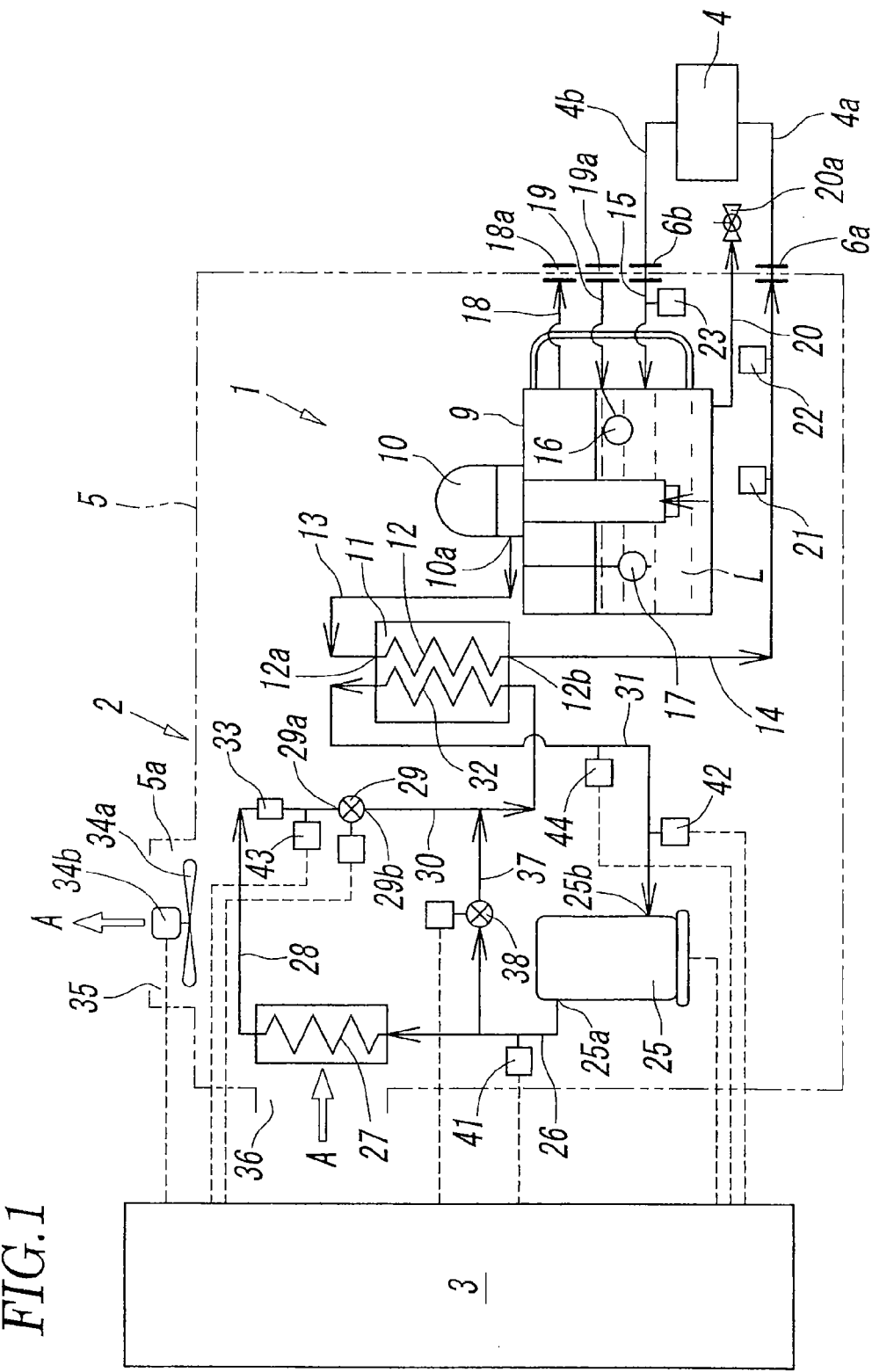
FIG. 1 is a configuration diagram illustrating a constant-temperature liquid circulation apparatus according to an embodiment of the invention.

FIG. 1 is a diagram illustrating a constant-temperature liquid circulation apparatus according to an embodiment of the invention. The constant-temperature liquid circulation apparatus includes a constant-temperature liquid circuit 1 supplying a temperature-adjusted constant-temperature liquid L to a load 4 in a circulating manner and to cool and heat the load 4, a refrigeration circuit 2 adjusting a temperature of the constant-temperature liquid L to a temperature set by heat exchange with a refrigerant, and a controller 3 controlling the entire apparatus. The constant-temperature liquid circuit 1 and the refrigeration circuit 2 is housed in a casing 5, and the load 4 is connected to a supply-side connection port 6a and a return-side connection port 6b which are formed in the casing 5.

The constant-temperature liquid circuit 1 is configured such that a constant-temperature liquid L accommodated in a tank 9 is sent to a temperature adjusting pipe 12 provided in a heat exchanger 11 using a pump 10 and is supplied to the load 4 after being adjusted to a set temperature by a heat exchange with a refrigerant of the refrigeration circuit 2 in the heat exchanger 11. For this reason, a discharge port 10a of the pump 10 and an inlet 12a of the temperature adjusting pipe 12 are connected to each other by a first supply pipe 13, an outlet 12b of the temperature adjusting pipe 12 and a supply-side connection port 6a formed in the casing 5 are connected to each other by a second supply pipe 14, the tank 9 and the return-side connection port 6b are connected to each other by a return pipe 15, and an inlet-side pipe 4a and an outlet-side pipe 4b of the load 4 are connected to the supply-side connection port 6a and return-side connection port 6b, respectively.

In the tank 9, a ball tap-typed liquid level meter 16 for measuring a liquid level of the constant-temperature liquid L and a level switch 17 are provided. Further, an overflow port 18a communicating with the tank 9 through an overflow pipe 18, an automatic liquid supply port 19a communicating with the tank 9 through a liquid supply pipe 19, and a drain port 20a communicating with the tank 9 through a drain pipe 20 are provided in the casing 5. Then, when the liquid level of the constant-temperature liquid L in the tank 9 abnormally rises, the constant-temperature liquid overflows from the overflow port 18a, and when the liquid level meter 16 detects that the liquid level of the constant-temperature liquid L drops, the constant-temperature liquid is supplied into the tank 9 from a liquid supply apparatus (not illustrated) connected to the automatic liquid supply port 19a. Moreover, when the level switch 17 detects that the liquid level of the constant-temperature liquid L abnormally drops, an alarm is issued.

In addition, a pressure sensor 21 at a constant-temperature liquid supply side and a first temperature sensor 22 at the constant-temperature liquid supply side are connected to the second supply pipe 14, and a second temperature sensor 23 at a constant-temperature liquid return side is connected to the return pipe 15. Based on measurement results of the pressure sensor 21 and the temperature sensors 22 and 23, the controller 3 controls the entire apparatus.

Therefore, the liquid level meter 16, the level switch 17, the pressure sensor 21, and the temperature sensors 22 and 23 are electrically connected to the controller 3, but the connection state is not illustrated.

Meanwhile, the refrigeration circuit 2 is configured such that a compressor 25, a condenser 27, a first expansion valve 29, and an evaporator 32 are sequentially connected to one another in series or in a circulation circuit form. Here, the compressor 25 compresses a gaseous refrigerant to change the refrigerant into a high-temperature and high-pressure gaseous refrigerant, the condenser 27 cools the high-temperature and high-pressure gaseous refrigerant sent from the compressor 25 through a first refrigerant pipe 26 to change the refrigerant into a high-pressure liquid refrigerant, the first expansion valve 29 expands the high-pressure liquid refrigerant sent from the condenser 27 through a second refrigerant pipe 28 to change the refrigerant into a low-temperature and low-pressure liquid refrigerant, and the evaporator 32 evaporates the low-temperature and low-pressure liquid refrigerant sent from the first expansion valve 29 through a third refrigerant pipe 30 by the heat exchange with the constant-temperature liquid L to change the refrigerant into a low-pressure gaseous refrigerant and sends the low-pressure gaseous refrigerant to the compressor 25 through a fourth refrigerant pipe 31. In FIG. 1, reference numeral 33 indicates a dryer.

The condenser 27 is an air-cooling condenser for cooling a refrigerant using a fan 34a driven by an electric motor 34b, the fan 34a is disposed in a fan housing part 5a formed at a top of the casing 5, and the fan housing part 5a is provided with an exhaust port 35 for emitting upward cooling air A. A suction port 36 is provided at a position facing the condenser 27 provided at a side surface of the casing 5 to suck outside air as the cooling air A. The cooling air A sucked from the suction port 36 cools the refrigerant when passing through the condenser 27 and then is emitted to the outside of the casing 5 from the exhaust port 35.

The compressor 25 and the fan 34a are electrically connected to the controller 3, and inverter control is performed by the controller 3 and thus a rotation speed of each of the compressor 25 and the fan 34a is controlled.

One end and the other end of a bypass refrigerant pipe 37 are connected to the first refrigerant pipe 26 and the third refrigerant pipe 30, respectively, and a second expansion valve 38 is connected to the bypass refrigerant pipe 37. The second expansion valve 38 is electrically connected to the controller 3 together with the first expansion valve 29, and thus the degree of opening of the second expansion valve 38 is controlled by the controller 3.

Preferably, each of the first expansion valve 29 and the second expansion valve 38 is an electronic expansion valve in which the degree of opening is adjusted by a stepping motor.

A first temperature sensor 41 is connected to the first refrigerant pipe 26 to measure a temperature the refrigerant discharged from the compressor 25, a second temperature sensor 42 is connected to the fourth refrigerant pipe 31 to measure a temperature of the refrigerant sucked into the compressor 25, a first pressure sensor 43 is connected to the second refrigerant pipe 28 to measure a pressure of the refrigerant sent to the first expansion valve 29, and a second pressure sensor 44 is connected to the fourth refrigerant pipe 31 to measure a pressure of the refrigerant sucked into the compressor 25. The temperature sensors 41 and 42 and the pressure sensors 43 and 44 are electrically connected to the controller 3, respectively, and thus the entire apparatus is controlled by the controller 3 based on the measurement results.

Further, in the refrigeration circuit 2, a portion extending from an outlet 25a of the compressor 25 to an inlet 29a of the first expansion valve 29 via the condenser 27 corresponds to a high-pressure side portion in which the pressure of the refrigerant is high. On the other hand, a portion extending from an outlet 29b of the first expansion valve 29 to an inlet 25b of the compressor 25 via the evaporator 32 corresponds to a low-pressure side portion in which the pressure of the refrigerant is low.

Figure 2:
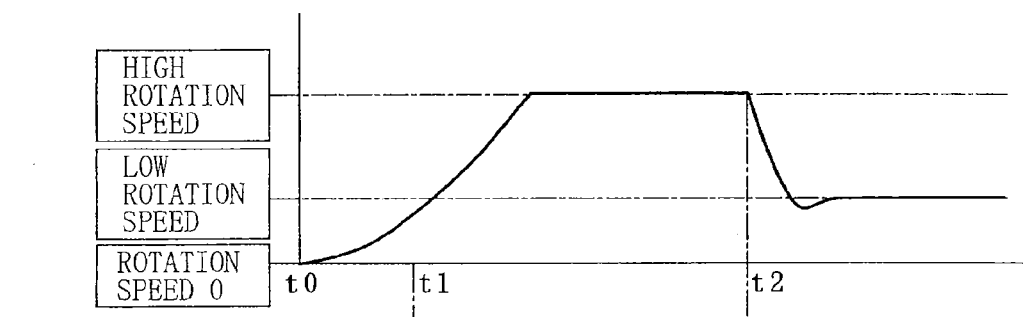
FIG. 2 is an operation timing chart of the constant-temperature liquid circulation apparatus illustrated in FIG. 1.
Figure 2:
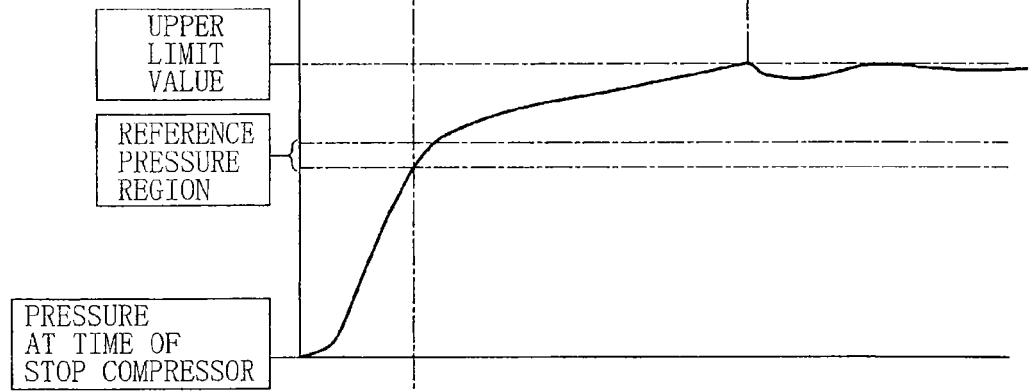
Figure 2:
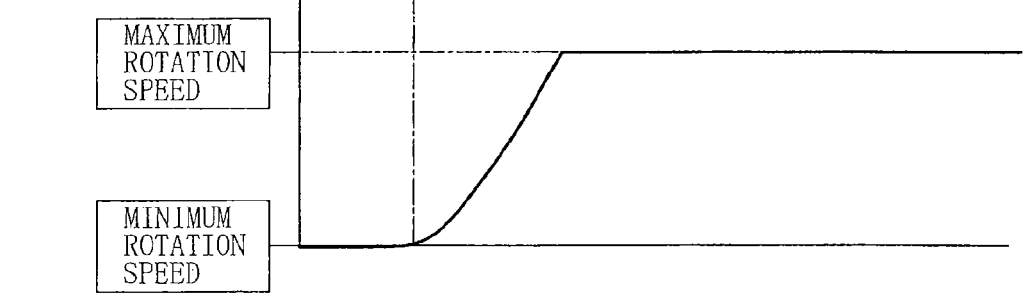
Figure 3:
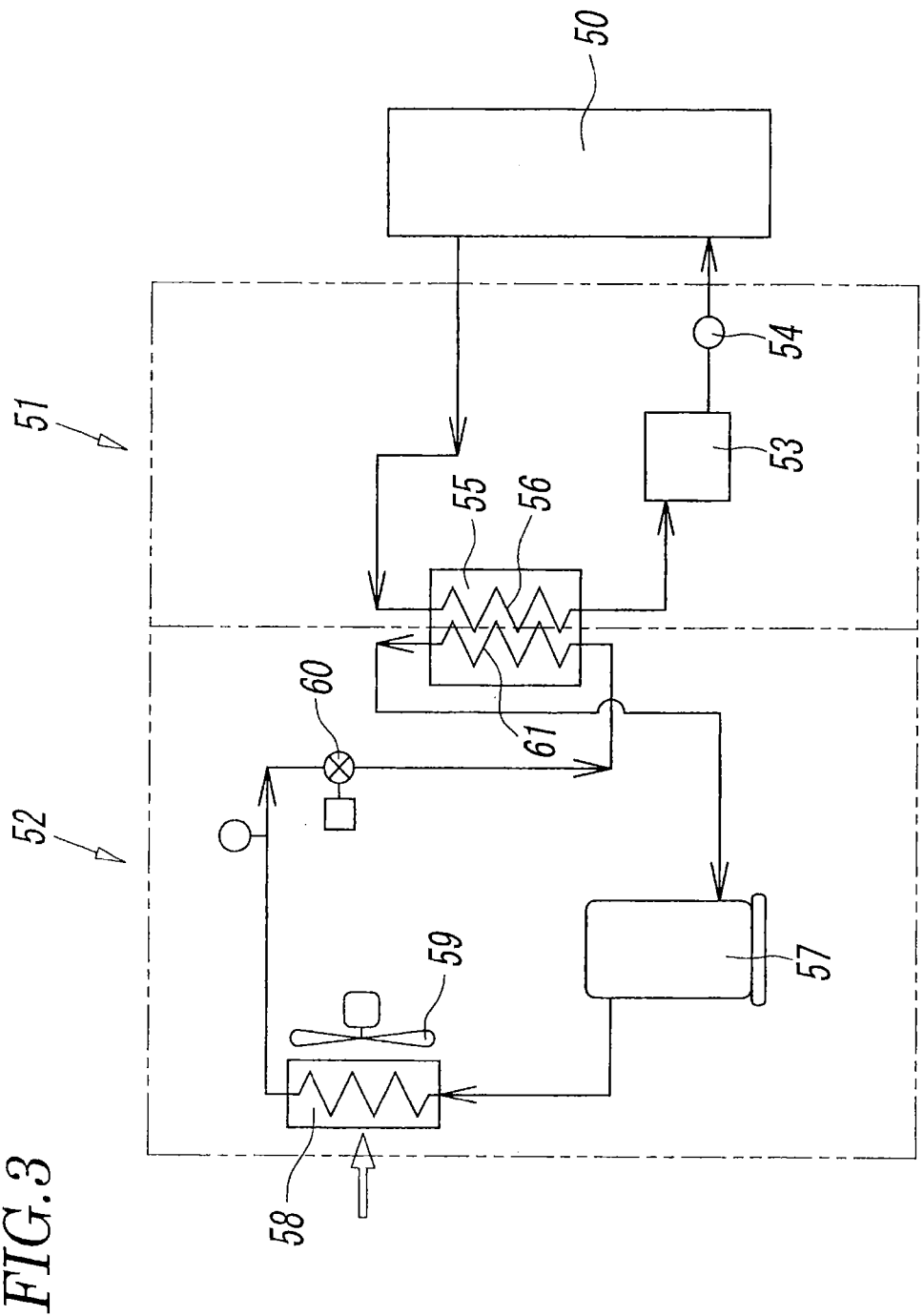
FIG. 3 is a configuration diagram illustrating a constant-temperature liquid circulation apparatus according to the related art.

FIG. 2 is a timing chart illustrating an example of control of the compressor 25 and the fan 34a at the time of driving operating the operation of the constant-temperature liquid circulation apparatus. Such a control example indicates a case of cooling the load 4, which generates heat, with the constant-temperature liquid. Hereinafter, an operation method of the constant-temperature liquid circulation apparatus will be described according to the timing chart.

First, when the pump 10 of the constant-temperature liquid circuit 1 is driven at time t0 and thus the supply of the constant-temperature liquid L to the load 4 starts or after the lapse of prescribed time, the operation of the compressor 25 in the refrigeration circuit 2 starts, the rotation speed of the compressor 25 is controlled by the inverter control and gradually rises toward a high rotation speed which is a rotation speed during a steady operation.

At this time, the fan 34a of the condenser 27 is not activated for some time even after the compressor 25 is activate or is rotated close to a minimum rotation speed after being activated.

In addition, by the activation and the rising of the rotation speed of the compressor 25, the refrigerant pressure at the high-pressure side portion to be measured by the first pressure sensor 43 gradually increases in the refrigeration circuit 2.

Then, when the refrigerant pressure at the high-pressure side portion reaches a reference pressure region at time t1, the rotation speed of the fan is increased by the inverter control. Thus, since the volume of the cooling air A increases with respect to the condenser 27, a condensation temperature of the refrigerant in the condenser 27 gradually rises, and according to this, the refrigerant pressure gradually also rises in a similar manner. The refrigerant pressure increases or decreases, for example, the rising degree thereof varies due to the rotation speed (volume of the cooling air A) of the fan 34a, the temperature of the cooling air A or the like or the refrigerant pressure decreases in some cases.

At this time, the rotation speed of the fan is controlled to be increased and decreased by the inverter control in the range of the maximum rotation speed or less depending on the rising degree or the increase and decrease of the refrigerant pressure, but when the refrigerant pressure has a more rising tendency in the vicinity of the reference pressure region, the rotation speed of the fan gradually rises so as to be capable of maintaining the refrigerant pressure in the vicinity of the reference pressure region or below the reference pressure region by suppressing any higher pressure rising. On the other hand, when it is necessary to cool the load, the rotation speed of the compressor 25 instantly reaches the high rotation speed as the rotation speed during the steady operation and is controlled near the rotation speed.

Then, when the refrigerant pressure exceeds the reference pressure region and continues to further rise, the rotation speed of the fan 34a rises to the maximum rotation speed. This state is a state in which the fan 34a and the condenser 27 are fully operated, and generally, the rising of the refrigerant pressure becomes more gradual or will stop in this state. Accordingly, the constant-temperature liquid circulation apparatus will be stably operated in this state.

However, regardless of when the fan 34a and the condenser 27 are fully operated, the refrigerant pressure continues to rise due to the influence of an ambient temperature or the like. When the refrigerant pressure reaches an upper limit value at time t2, the rotation speed of the compressor 25 is reduced from the high rotation speed by the inverter control while maintaining the rotation speed of the fan 34a at the maximum rotation speed. Thus, since the flow rate of the refrigerant discharged from the compressor 25, the condensation temperature in the condenser 27 is lowered, and the rising of the refrigerant pressure at the high-pressure side portion is suppressed. In this case, as illustrated in FIG. 2, when the rotation speed of the compressor 25 is controlled to be lowered up to a low rotation speed such that the refrigerant pressure is maintained at the upper limit value, the refrigerant pressure become almost constant near the upper limit value.

Consequently, although the capability for cooling the constant-temperature liquid L is reduced by the refrigeration circuit 2, the temperature of the constant-temperature liquid L can be continuously controlled. Therefore, it is not necessary to stop the refrigeration circuit or to stop the operation of the entire constant-temperature liquid circulation apparatus.

Thus, in the constant-temperature liquid circulation apparatus, it is possible to reduce the refrigerant pressure without stopping the compressor 25 by performing the inverter control on the rotation speed of the compressor 25 and the rotation speed of the fan 34a of the air-cooling condenser 27 according to the refrigerant pressure at the high-pressure side portion in the refrigeration circuit 2. As a result, it is possible to continuously perform the temperature control of the constant-temperature liquid without stopping the entire apparatus.

The degree of opening of the first expansion valve 29 and the second expansion valve 38 are also controlled in parallel with the control of the rotation speed of the compressor 25 and the fan 34a to adjust the flow rate, the temperature or the like of the refrigerant flowing through the evaporator 32, and thus the temperature of the constant-temperature liquid L is adjusted.

Further, the second expansion valve 38 connected to the bypass refrigerant pipe 37 of the refrigeration circuit 2 supplies a portion of the high-temperature and high-pressure refrigerant gas discharged from the compressor 25 into the fourth refrigerant pipe of the low-temperature and low-pressure between the first expansion valve 29 and the evaporator 32 to increase the temperature flowing through the fourth refrigerant pipe and thus to achieve functions of, for example, adjusting the cooling capability of the heat exchanger 11 or adjusting the refrigerant pressure at the high-pressure side portion of the refrigeration circuit 2.

The invention claimed is:

1. A constant-temperature liquid circulation apparatus comprising:
   a constant-temperature liquid circuit supplying a temperature-adjusted constant-temperature liquid to a load;
   a refrigeration circuit adjusting a temperature of the constant-temperature liquid by heat exchange of the constant-temperature liquid with a refrigerant; and
   a controller controlling the entire apparatus, wherein the refrigeration circuit includes:
      a compressor compressing a gaseous refrigerant to change the refrigerant into a high-temperature and high-pressure gaseous refrigerant;
      an air-cooling condenser cooling the high-temperature and high-pressure gaseous refrigerant sent from the compressor to change the refrigerant into a high-pressure liquid refrigerant;
      a fan forcing cooling air to flow into the condenser;
      an expansion valve expanding the high-pressure liquid refrigerant sent from the condenser to change the refrigerant into a low-temperature and low-pressure liquid refrigerant;
      an evaporator evaporating the low-temperature and low-pressure liquid refrigerant sent from the expansion valve by heat exchange with the constant-temperature liquid to change the refrigerant into a low-pressure gaseous refrigerant, thereby sending the low-pressure gaseous refrigerant to the compressor; and
      a pressure sensor measuring an inlet-side refrigerant pressure of the expansion valve, and
   wherein the controller is configured to perform control such that the fan is not activated, or is activated to maintain a minimum rotation speed when a refrigerant pressure measured by the pressure sensor does not reach a reference pressure region after the compressor is activated, control the refrigerant pressure by performing inverter control on a rotation speed of the fan when the refrigerant pressure reaches the reference pressure region, and control a rotation speed of the compressor to be reduced from a high rotation speed which is a rotation speed during a steady operation while maintaining the rotation speed of the fan at a maximum rotation speed when the refrigerant pressure continues to further rise and reaches an upper limit value after a rotation of the compressor reaches the high rotation speed which is a rotation speed during a steady state operation and the rotation speed of the fan reaches the maximum rotation speed.

2. The constant-temperature liquid circulation apparatus according to claim 1, wherein the controller reduces the rotation speed of the compressor from the high rotation speed to a low rotation speed at which a refrigerant pressure becomes constant near the upper limit value when the refrigerant pressure reaches the upper limit value.

3. An operation method of a constant-temperature liquid circulation apparatus, in which the constant-temperature liquid circulation apparatus includes: a constant-temperature liquid circuit supplying a temperature-adjusted constant-temperature liquid to a load; and a refrigeration circuit adjusting a temperature of the constant-temperature liquid by heat exchange of the constant-temperature liquid with a refrigerant, the refrigeration circuit including: a compressor compressing a gaseous refrigerant to change the refrigerant into a high-temperature and high-pressure gaseous refrigerant; an air-cooling condenser cooling the high-temperature and high-pressure gaseous refrigerant sent from the compressor to change the refrigerant into a high-pressure liquid refrigerant; a fan forcing cooling air to flow into the condenser; an expansion valve expanding the high-pressure liquid refrigerant sent from the condenser to change the refrigerant into a low-temperature and low-pressure liquid refrigerant; an evaporator evaporating the low-temperature and low-pressure liquid refrigerant sent from the expansion valve by heat exchange with the constant-temperature liquid to change the refrigerant into a low-pressure gaseous refrigerant, thereby sending the low-pressure gaseous refrigerant to the compressor; and a pressure sensor measuring an inlet-side refrigerant pressure of the expansion valve, wherein the method comprising:

performing control such that the fan is not activated, or is activated to maintain a minimum rotation speed when a refrigerant pressure measured by the pressure sensor does not reach a reference pressure region after the compressor is activated;

controlling the refrigerant pressure by performing inverter control on a rotation speed of the fan when the refrigerant pressure reaches the reference pressure region; and controlling a rotation speed of the compressor to be reduced from a high rotation speed which is a rotation speed during a steady operation while maintaining the rotation speed of the fan at a maximum rotation speed when the refrigerant pressure continues to further rise and reaches an upper limit value after a rotation of the compressor reaches the high rotation speed which is a rotation speed during a steady state operation and the rotation speed of the fan reaches the maximum rotation speed.

4. The operation method of the constant-temperature liquid circulation apparatus according to claim 3, further comprising: reducing the rotation speed of the compressor from the high rotation speed to a low rotation speed at which a refrigerant pressure becomes constant near the upper limit value when the refrigerant pressure reaches the upper limit value.

* * * * *